April 7, 1942.　　　E. H. FRENCH　　　2,278,543
DISTILLATION PROCESS
Filed Aug. 5, 1937　　　3 Sheets-Sheet 1

INVENTOR
Edward H. French.

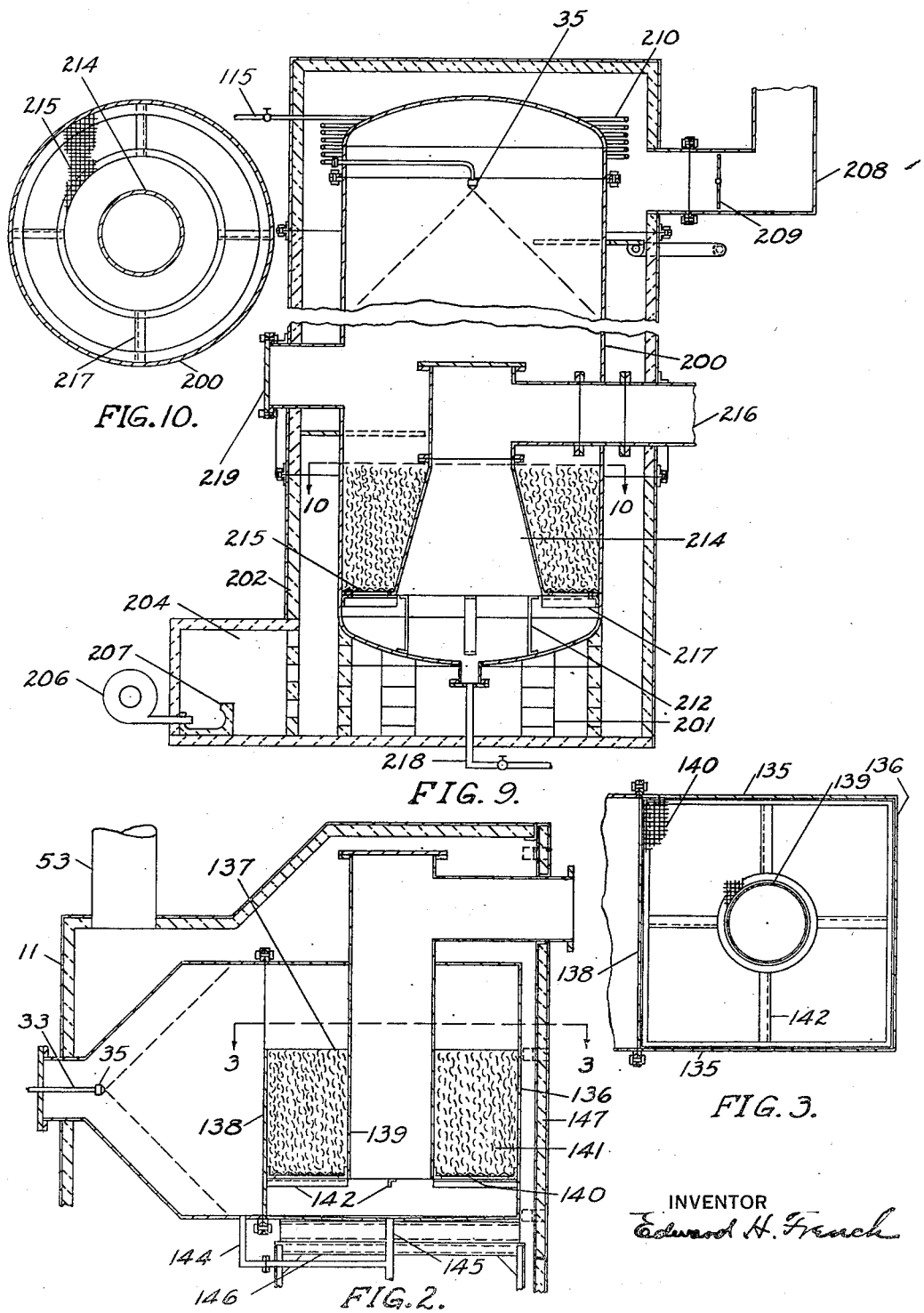

April 7, 1942. E. H. FRENCH 2,278,543
DISTILLATION PROCESS
Filed Aug. 5, 1937 3 Sheets-Sheet 3
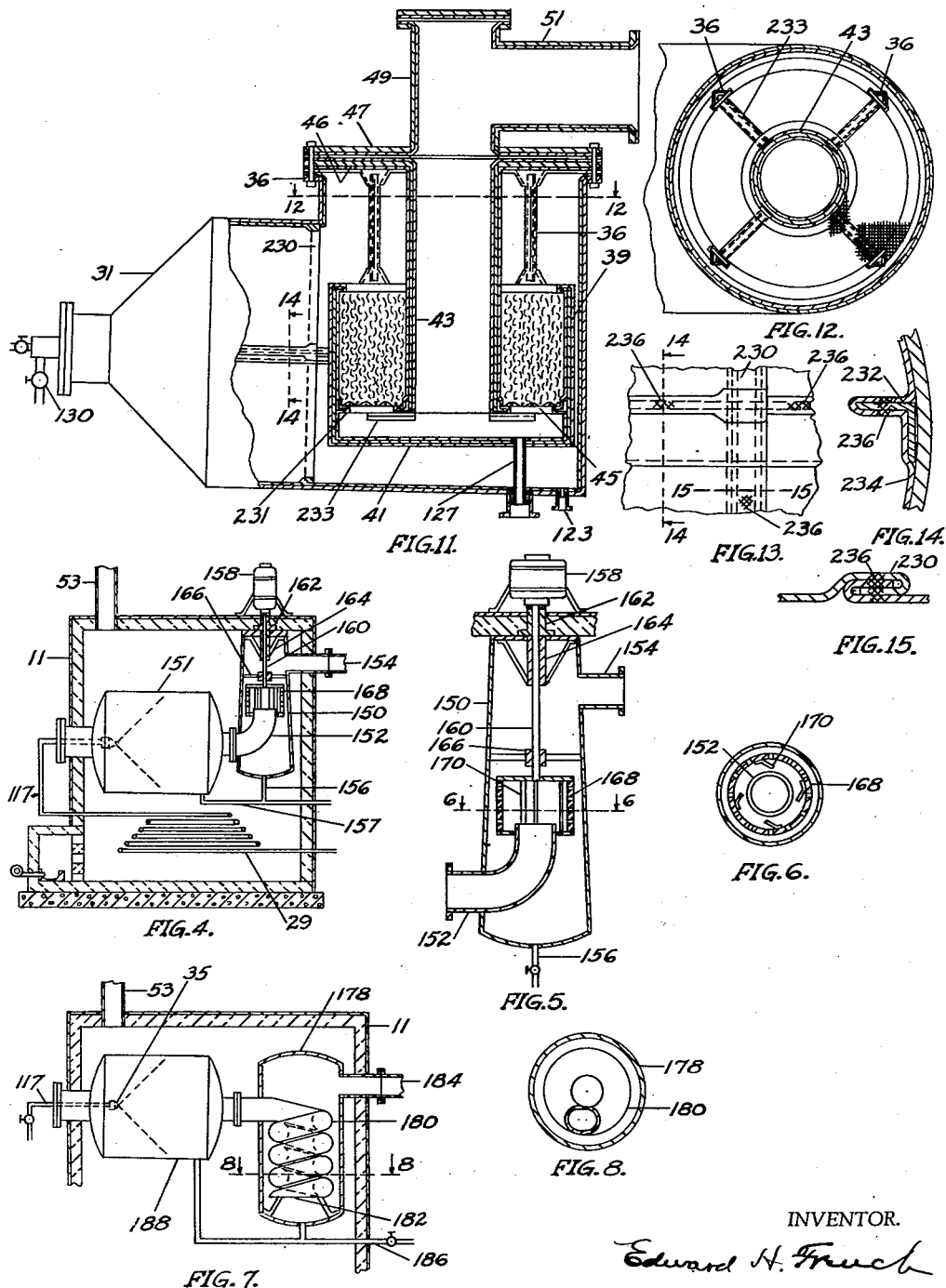
INVENTOR.
Edward H. French Patented Apr. 7, 1942

2,278,543

UNITED STATES PATENT OFFICE 2,278,543

DISTILLATION PROCESS

Edward H. French, Columbus, Ohio

Application August 5, 1937, Serial No. 157,561

17 Claims. (Cl. 202—53)

This invention relates to the distillation of liquids and liquid mixtures; and particularly those organic liquid mixtures containing components that are sensitive to heat utilized in connection with their recovery and/or purification, thereby being at least partially decomposed at high temperatures with the production of color bodies of complex structure. While the invention is highly serviceable in connection with the flash-vaporizing type of distillation processes described in my U. S. Patents Nos. 1,394,488 and 1,997,171, it has special utility for the distillation of such mixtures as "liquid rosin," and the so-called "tallol." (a mixture containing abietic, oleic, and linoleic acids, turpentine, phytosterol and other organic compounds,) mentioned in the last-named patent. It is, however, highly efficacious in distilling petroleum oils, and particularly the lubricating fractions thereof, and used lubricating oils such as "crank-case oils" which contain organic compounds of high molecular weight that are decomposed readily when exposed to high temperatures and pressures for prolonged periods of time.

Among the more important objects of the invention are the following: to provide for the distillation in novel manner of organic liquids readily decomposable by heat, while preventing substantial decomposition thereof; to provide a novel distillation unit adapted for effective use in a spray-vaporizing type of distillation process, making commercially possible the purification and recovery, undecomposed, of complex mixtures of heat-sensitive organic products, such as the liquid rosins produced in pulp and paper mills, even where, because of the relatively small amounts of rosin and fatty substances available for distillation, expensive installations such as those used in the petroleum industry would not be practical. These and other objects will be apparent from the following description of my invention.

Heretofore, in distilling lubricating oils, liquid rosin, and other mixtures of heat-sensitive materials, it has been necessary, in order to avoid cracking or decomposition of these compounds, to reduce by means or various partial pressure effects the temperature at which they distill. This effect usually has been produced by the aid of a vacuum, or by the introduction of an inert gas into the still. In petroleum distillation this effect usually is secured by superheated steam. In modern practice the oil is preheated in a tube still and is flash vaporized in the presence of superheated steam in a chamber, from which the gases pass into a bubble-cap column, and from the latter into a dephlegmating column, and thence into condensers, the residual vapors then flowing to the "tail house." All of such systems as designed, are large and expensive distillation units. In the crude starting materials are impurities consisting of suspended non-distillable bodies that must be removed. When the highly heated crude material is atomized into the still these impurities exist in very finely divided state, and so are carried forward by the vapors into the dephlegmating column and condensers, thereby contaminating the finished product unless removed in the said column. In oil refining, these bodies usually are removed in a bubble-cap type column. The latter must be heated by superheated steam or other vapor to prevent premature condensation of the oil before these tarry bodies are washed out in the lower sections of the column. In washing out these bodies the column restricts the free flow of the vapors in order to pick up the finely divided mist of tarry bodies in the liquid present in the column. The liquid in each section retards the free flow of vapors through the column, thus increasing the time during which the vapors remain in the still. In each section there is a violent agitation of the liquid and vapors, due to vapors passing through liquid. This is especially true when a vacuum is used. This countercurrent intermingling of liquids and vapors also definitely increases the time that the vapors are in contact with the liquid containing the impurities.

Applicant has frequently observed that when distilling solutions of many complex organic compounds that are highly sensitive to heat, such as "tallol," or lubricating fractions of mineral oils, dissolved in solvents such as kerosene, gasoline, etc., the use of a dephlegmating column causes color bodies and impurities to be formed and to follow through and appear in the resultant condensate. Applicant has now discovered that, by the use of the process and apparatus hereinafter described, which avoids the countercurrent contact of vapors and liquids, and provides free passage for the vapors through a still and associated condensers while removing entrained liquids at high temperatures, any color bodies and impurities formed are prevented from flowing with the vapors from the still to the condensers and appearing in the finished product.

According to a preferred modification of the present invention, the liquid mixture to be distilled and refined is dissolved in a suitable solvent; and the resultant solution, preferably after filtration or other treatment to remove any substances thereby precipitated, is preheated to a temperature below that at which decomposition of the liquid components occurs. The preheated liquid or solution then is spray vaporized or atomized within a still maintained at a temperature at which, under the pressure conditions existing therein, the liquid is quickly vaporized. The resultant vapors promptly thereafter pass into intimate contact with a mass of inert contact material maintained at approximately the temperature of the still, the said contact material preferably consisting of a mineral wool or glass wool so loosely packed that it offers little or no resistance to the passage therethrough of the vapors. The liquid particles in the vapors or mist are deposited or coalesce upon the surfaces of this inert material, while the true vapors freely pass therethrough. The arrangement of parts preferably is such that the fluids flow downwardly through the scrubber material. Within the scrubber, or immediately upon leaving the latter, the vapors change direction sharply, while still being maintained at substantially their distillation temperature, whereby any coalesced liquid particles still present therein are thrown out. The vapors then flow quickly from the still to the first of a series of condensers. In each of the latter the vapors flow downwardly, different fractions thereof being condensed in the respective condensers depending upon the conditions maintained therein, and upon the nature of the vapors being condensed, and are withdrawn from the bottom of the condenser in which condensed.

In the practice of the invention according to one modification, the still and condenser system is maintained under high vacuum to facilitate operation of the still-scrubber unit at a temperature at which, during the extremely short period of existence of the vapors at such temperatures, no decomposition of the heat-sensitive materials occur, even in the presence of the highly heated contact materials mentioned. According to another modification, an inert gas such as carbon dioxide, nitrogen, natural gas, or hydrogen is introduced into the still with the atomized solution in order to facilitate the distillation of the solution at temperatures sufficiently low to prevent decomposition of the organic compounds. The advantage of this partial pressure effect may be secured in operations conducted under atmospheric pressure as well as those under vacuum.

It is important in the practice of the present invention that coalescence of the liquid and solid particles present in the spray or mist delivered within the still be effected promptly after the spraying operation, by suitable means, such as a contact mass which itself is at a temperature substantially that of the mixed vapors, so that such coalescence is accomplished while condensation of all vapors is prevented. The contact mass in the scrubber should be so arranged as to offer substantially little or no resistance to the downward flow of the vapors therethrough. The subsequent sharp change of direction of the rapidly flowing vapors assists to separate therefrom any traces of liquids and solids coalesced in the scrubber or dripping from the latter. No true filtering action is manifested.

The invention will now be illustrated in connection with the production of rosin and fatty acids of high purity from alkaline pulping liquors produced in the pulping of wood, such as is described in my United States Patent No. 1,997,171. These alkaline pulping liquors, containing resins and oily substances in the form of their water-soluble salts or soaps are treated with an acidic substance such as a mineral acid or an acid gas. The rosin and fatty acids, etc., are then dissolved in a suitable solvent, such as gasoline, kerosene, naphtha, or gas oil. Preferably the solvent is immiscible with water. If desired, the solution of rosin and oily substances may be then treated in the cold with strong sulphuric acid to remove objectionable unsaturated compounds in well-known manner, following which the residual acid and water soluble reaction products are washed from the solution of rosin with water. The solution is then filtered in the cold to remove precipitated matter or "nigre" therein.

In forming the aforesaid solution it is preferred to employ around 4 or more parts by weight of the solvent to each part by weight of the mixture of rosin and oily substances or fatty acids. Under these conditions certain objectionable color- and odor-producing bodies deposit from the solution and are removable, even prior to the sulphuric acid treatment of the solution when such treatment is used.

The filtered solution is then heated by suitable means to a temperature sufficiently high to vaporize the volatile constituents at the pressure existing in the distillation zone, but below the temperature at which substantial cracking and decomposition of the volatilized components can occur under the conditions of operation. When utilizing the present flash-vaporizing process and maintaining the still under a vacuum of 28 to 29 inches of mercury, the solution is preheated to a temperature below around 315° C., and preferably around 250-260° C. The initial stage of the preheating preferably is accomplished by heat exchange with the vapors leaving the still, being effected in a series of condensers so regulated that the liquid being preheated acts successively to fractionally condense the rosin, fatty acids and solvent.

The thus preheated solution is forced under pressure through a spray nozzle into a distillation chamber or zone which by appropriate means is maintained at a temperature preferably within the range from 245-275° C., or approximately that of the preheated solution, the conditions being so adjusted by use of vacuum or by the introduction of an inert gas that the solution is instantly vaporized. The vapors are quickly removed from the distillation zone substantially as rapidly as formed, passing downwardly through the hot scrubber or equivalent means provided for coalescing minute particles of unvaporized materials and separating them from the vapors while maintaining the latter at the said high temperatures.

The quick removal of the stripped vapors from the high temperature zone as rapidly as formed is secured by maintaining sufficient voids in the mass of fibrous scrubber material, when this type of device is used, to allow free passage of the vapors, while maintaining a high vacuum and a regulated rapid flow of vapors to the condensers.

An important feature of the invention resides in the location within the high-temperature zone of the still, or of the furnace, of the scrubber or equivalent means for removing entrained matter from the vapors. This prevents sufficient loss of heat by the high-boiling vapors to cause the conversion of any portion thereof to liquids, since such liquids will not absorb enough heat in the system thereafter to be revaporized unless superheated solvent is introduced into the still to supply further heat, or unless the requisite partial pressure effect is otherwise secured.

The vapors leaving the still are fractionally condensed in a series of condensers, in each of which the vapors and condensate passing therethrough flow downward. This serves the important purpose in the present process of effectively condensing the vapors promptly and removing the condensate from the uncondensed vapors while permitting the free uninterrupted flow of the latter in a manner that does not reduce the effectiveness of the main vacuum pump for continuously holding a selected high vacuum in the system. In a preferred modification of the process the solution flowing to the still for flash-vaporization is used as the heat-exchange fluid in the condensers; in which it flows in a direction countercurrent to the flow of vapors being condensed, but out of direct contact therewith.

In the accompanying drawings, which illustrate certain apparatus features of the invention particularly adapted for the flash-distillation of organic liquids containing heat-sensitive components—

Fig. 2 is a fragmentary longitudinal section through one form of still-scrubber assembly and associated parts, portions being broken away;

Fig. 3 is a vertical section taken along the line 3—3 of Fig. 2, looking in the direction of the arrows;

Fig. 4 is a longitudinal section through another form of still-scrubber assembly and associated parts, parts being omitted;

Fig. 5 is a longitudinal section through the scrubber of Fig. 4, on an enlarged scale;

Fig. 6 is a transverse section taken along the line 6—6 of Fig. 5, looking in the direction of the arrows;

Fig. 7 is a fragmentary longitudinal section taken through another form of still-scrubber assembly, parts being omitted;

Fig. 8 is a transverse section taken along the line 8—8 of Fig. 7, looking in the direction of the arrows;

Fig. 9 is a vertical section through a vertically-disposed still-scrubber assembly and associated parts, portions being broken away;

Fig. 10 is a transverse section taken along the line 10—10 of Fig. 9, looking in the direction of the arrows;

Fig. 11 is a view somewhat similar to Fig. 2, of a modified form of still-scrubber assembly, parts being broken away, showing the lining of corrosion-resistant metal;

Fig. 12 is a transverse section taken along the line 12—12 of Fig. 11, looking in the direction of the arrows;

Fig. 13 is a fragmentary view of the face of a portion of the inner lining of the still of Fig. 11, on an enlarged scale;

Fig. 14 is a section, on an enlarged scale, taken along the line 14—14 of Fig. 11, looking in the direction of the arrows; and Fig. 15 is a transverse section on an enlarged scale, taken along the line 15—15 of Fig. 13.

Figure 1:
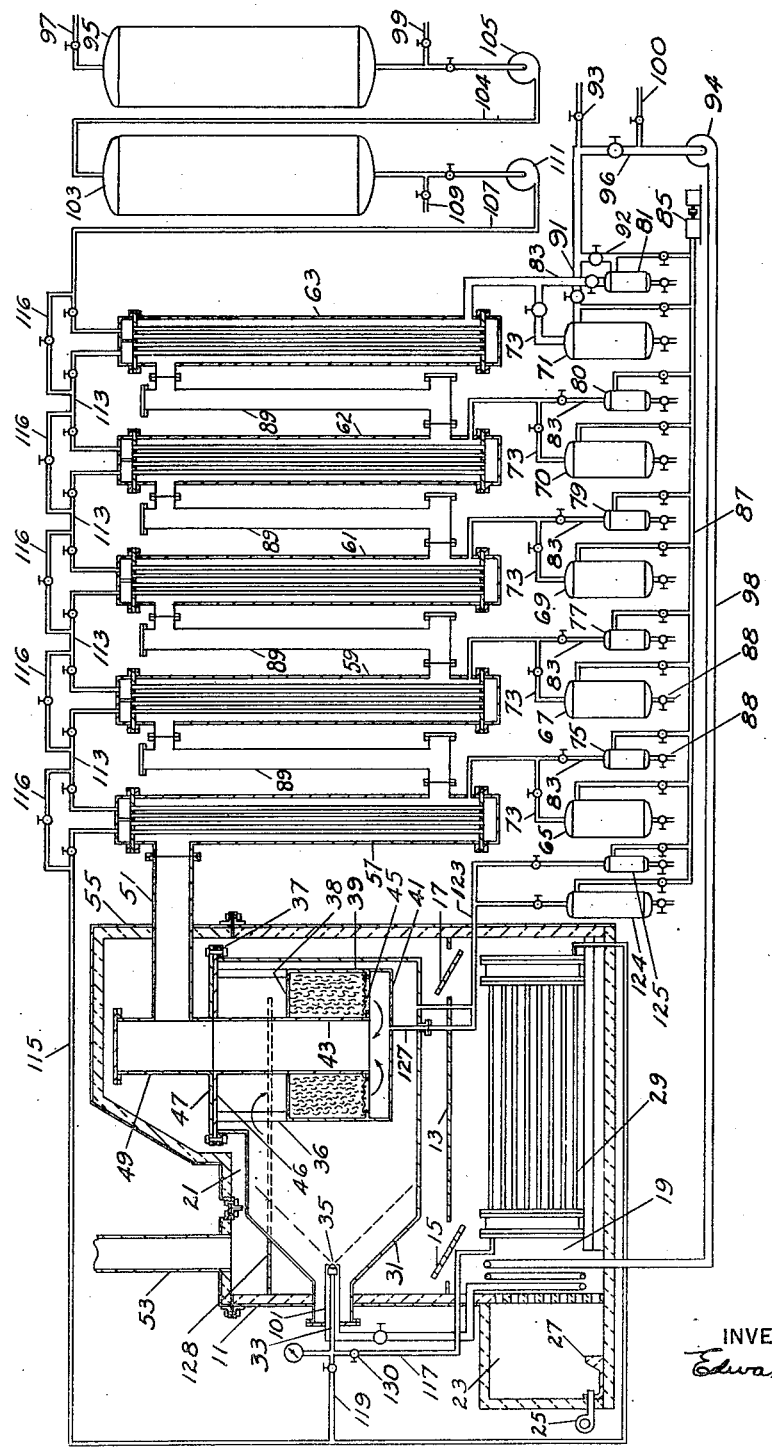
Fig. 1 is a somewhat diagrammatic view of a still and condenser system, parts being shown in section.

Referring particularly to Fig. 1 of the drawings, numeral 11 designates a furnace or still housing, constructed of or lined with heat-refractory material. A suitable baffle 13, having openings therein at the respective front and rear ends of the furnace, controlled by dampers 15, 17, divides the interior of the housing into a lower preheating chamber 19 and an upper heating chamber 21. A combustion chamber 23 provided with suitable burners 25 and a deflecting baffle 27, is arranged to discharge hot combustion gases over and around the tubes of a heat-exchanger 29 disposed within the chamber 19.

Longitudinally disposed within the chamber 21 is a distillation vessel or still 31, preferably made of or lined with a corrosion-resistant alloy such as stainless steel, nickel, or Monel metal, as hereinafter described. The end of the still adjacent the front end of chamber 21 has sloping side walls terminating in a central neck provided with an end closure plate through which extends a liquid inlet line 33, provided with an atomizing nozzle 35. Removably mounted within the opposite end of the still 31, and suspended by spaced supporting members 36 from flanged margins 37 surrounding an opening in the upper wall of the still, is a scrubber vessel 38 of metal, having side walls 39 and an imperforate bottom 41. The interior of the scrubber is in free communication at all times at its upper end with the interior of the still, as shown, and contains a mass of loosely-packed, solid, inert contact material such as fibrous mineral wool. The scrubber has a central, vertically-disposed vapor outlet conduit 43 extending downward to a point near the bottom 41. An annular foraminous member or screen 45 is supported upon the lower margin of conduit 43 and the adjacent portions of side wall 39. The upper end of conduit 43 terminates in a flat cover plate 46 that forms a flanged seal with the flanged margins 37 of the still wall and with an interposed gasket of suitable material, these parts being secured together by bolts or their equivalent. A closure plate 47 having a central opening and carrying an outlet conduit 49 in alignment with conduit 43 also is secured to the plate 46 and still 31 by the said bolts. Conduit 49 has a lateral member 51 extending through the wall of the furnace housing. The front end of the furnace has a stack 53 for waste furnace gases. The rear end of the housing is provided at the top with an insulated, removable cap or cover 55 adapted to house the upper end of the still, scrubber and associated parts. The cover 55 is removed whenever the scrubber is taken out for inspection or treatment of the contact material.

For condensing vapors flowing from the still there are provided a series of condensers 57, 59, 61, 62 and 63, so arranged and constructed that the vapors to be condensed flow downwardly in each successive condenser. Liquids condensed in the respective condensers flow from the lower outlets thereof into corresponding receivers 65, 67, 69, 70, 71 through valve-controlled conduits 73, or, alternatively, into auxiliary receivers 75, 77, 79, 80, and 81 through valve-controlled conduits 83 when the main receivers are being emptied. Each of the said receivers is connected with a vacuum pump 85 through the conduit 87 and branch-controlled conduits as shown, and each has a valve-controlled liquid discharge line 88.

Vapor conduits 89 connect the lower portion of each condenser with the upper portion of the next successive condenser. Valve-controlled vapor outlet lines 91, 92 from the last receivers 71, 81, lead to a vacuum pump (not shown) past valve 93, and conduct uncondensed gases from the system. Alternatively, when inert gases are recirculated in the system for their partial pressure effect in the still, valve 93 is closed, and a gas circulating pump 94 conducts the said gases to the spray nozzle 35 in the still, from lines 91, 92, through valve-controlled lines 96, 98, or from a source of supply of the said gases through line 100. The line 98 passes through the furnace where the recirculated gases are again heated; and the line conducts the heated gases to the still and discharges them into the latter through an annular passage 101 surrounding the nozzle 35.

For preparing and pretreating the solution of organic material to be distilled, there is provided a vessel 95 having an inlet line 97 for the crude material and solvent, and a bottom outlet line having a valve-controlled waste discharge line 99, and a solution discharge line connected with a second vessel 103 by a valve-controlled conduit 104 having therein a pump 105. A liquid outlet line 107 from vessel 103 has therein a valve-controlled waste discharge line 109 and a pump 111. Line 107 is connected with the upper inlet end of condenser 63, the construction of the latter being such that the liquid from line 107 flows downwardly and then upwardly through the tubes therein in indirect heat-exchange relation with the vapors flowing through the condenser from the still. The thus-heated liquid then flows successively through the lines 113 to the other condensers of the series, and finally flows from condenser 57 through line 115 to the preheater 29. A valve-controlled line 117 leads liquid from the preheater to the liquid inlet line 33 at the still. Valve-controlled bypass line 116 permits bypassing of any condenser by any part or all of the liquid, when desired. A valve-controlled branch line 119 connects the line 115 directly with the inlet line 35 and permits bypassing the preheater by any or all of the liquid, where this is advantageous. The spray nozzle 35 is adapted to introduce the liquid into the still in finely divided form under any selected pressure.

For removing from the still any unvaporized liquid in the event it should accumulate, a drain line 123 connects the bottom of the still with a receiver 124 and auxiliary receiver 125, each of the latter being connected with the vacuum line 87 as shown. For removing from the bottom of the scrubber 38 any coalesced mist or unvaporized liquid formed in the still and caught in or on the scrubber contact material a conduit 127 connects the scrubber bottom with the drain line 123. A baffle 128 in the housing near the upper portion of the still directs the hot furnace gases around the rear end of the still and scrubber to maintain the same at uniformly high temperatures. By regulating the dampers 15, 17, the hot gases may be directed as desired over the preheater and/or over the respective ends of the still.

Although the scrubber 38 may function as a filter for removing any filterable material present, that is not its primary purpose. In fact the usual finely divided filtering materials such as fuller's earth, kaolin, absorbent clays, and the like, tend to obstruct the rapid flow of vapors through and out of the high temperature scrubbing zone wherein unvaporized particles are coalesced. This is due to the relatively low percentage of voids present therein, as distinguished from glass wool, steel wool, glass beads, pieces of earthenware and the like employed by applicant as coalescing media. In the claims, the term "solid scrubbing medium having a high percentage of voids" and similar terms refer to coalescing media of the latter type, which allow free flow of the vapors through and from the hot scrubbing zone. In one instance, utilizing the apparatus described for distilling a 20% solution of rosin and fatty materials in naphtha having a boiling range between 150° C. and 205° C., excellent results were secured in a distillation conducted at temperatures within the range from 160° C. to 275° C., under a vacuum of 28 inches of mercury, using in the scrubber a 24 inch depth of glass wool having over 50% of voids.

In the practice of the invention, utilizing the apparatus of Fig. 1, the heat-sensitive organic materials to be distilled are introduced into the vessel 95 together with the desired amount of the solvent, which is thoroughly mixed therewith. The solution then is treated with around 2 to 6% of concentrated sulphuric acid in well known manner in order to remove objectionable unsaturated bodies. The mixture in vessel 95 is settled, and the water and sludge are withdrawn through line 99. The residual liquid in the vessel is then washed with water, the washings also being removed through line 99. The washed solution is then pumped into storage tank 103. From here it is pumped by pump 111 to the preheater 29, passing successively through each of the condensers 63, 62, 61, 59, an 57. Any or all of the condensers may be bypassed, if desired, through lines 116. The preheated solution flows from the preheater to the spray nozzle 35 through line 117 controlled by valve 130. The valve-controlled bypass line 119 permits the cooling or dilution when desired of the preheated solution flowing to the still. The vapors and atomized liquid particles formed in the still are quickly drawn into the hot scrubber through its open upper end, and thence pass downwardly through the contact material to the scrubber bottom where the vapors abruptly change direction. Any coalesced liquids impinge or are deposited upon the said bottom, the hot stripped vapors being rapidly withdrawn from the scrubber through lines 43, 49 and 51. They then enter the condenser system, through which they pass in obvious manner, the vapors flowing downwardly in each condenser, so that any condensate flows in the same direction as the uncondensed vapors, and does not interfere with the free flow of the latter. The liquids condensed in the respective condensers flow downwardly to the receivers associated therewith, from which they can be withdrawn as desired. The vacuum pump 85 serves to vacuumize the receivers and the residue storage tanks 124—125 after the latter have been cut off the line for discharge of their contents, and before again cutting them into the system. Thus are prevented all substantial variations in the vacuum maintained in the main still-condenser system, such as occur when unvacuumized vessels are connected with such system and which would produce uncontrollable variations in the products being formed in the still, and in the fractions being condensed in the respective condensers.

Figs. 2 and 3 show another type of still, similar in general to that of Fig. 1, but in which the still and scrubber are square in transverse cross-section. In this modification the scrubber 137 is in the rear end section of the still, and is formed by the side walls 135 and rear end wall 136 of the still, and a front wall or baffle member 138 which makes a fluid-tight joint with the still bottom and which extends upwardly to a point spaced from the still top so as to permit free access of vapors in the still to the upper end of the scrubber. The latter is separated into an inlet or contact compartment and an outlet compartment by the outlet line 139 having a flanged lower end cooperating with a flange in the inner wall of the scrubber to support a screen or screens 140 carrying a body of mineral wool or other mist-coalescing solids, 141. Supporting members 142 secured to the still wall and to line 139 reinforce the screens. Liquid drain lines 144, 145, respectively connect the still and scrubber with receiver 124 (see Fig. 1). The scrubber section of the still is removable from the furnace, being slideable on tracks 146, through a removable rear wall section 147 of the furnace housing.

Figs. 4 to 6 illustrate a form of the invention that is especially adapted for use in operations conducted at or around atmospheric pressure, and where inert gases are introduced into the still to facilitate operations at low temperatures obviating decomposition of the material being distilled. Here a scrubber 150 is mounted wholly within the furnace housing 11. The scrubber communicates with the outlet end of the still 151 through conduit 152, which extends within the scrubber and has its discharge end centrally disposed therein and directed upwardly. The scrubber has a vapor outlet 154 in the upper end. Liquid drain lines 156, 157, lead respectively from the bottoms of the scrubber and still to a suitable container, such as the receiver 124 (Fig. 1). The side walls of the scrubber 150 slope outwardly in a downward direction, so that any liquid particles impinging thereon freely flow to the drain line. Mounted upon the furnace housing is an electric motor 158, the armature shaft of which has an extension 160 extending through bearings carried by suitable bushings 162, 164, carried in the furnace wall and in the top of the scrubber. The extension also is provided with a central bearing carried by a centering spider 166 secured to the scrubber wall. A hollow cylindrical baffle member 168, having an imperforate top and a central opening in its bottom to accommodate the conduit 152, is secured to the lower end of shaft 160 for rotation with the latter. The side walls of the member 168 are foraminous, and have secured thereto vertically disposed angle members 170 adapted during rotation of the member 168 to impact the vapors and mist entering from conduit 152 and to discharge them laterally at high velocity against the walls of the rotating member 168 and of the scrubber 150. The other parts of the furnace and associated parts are in general the same as shown in Fig. 1. During operation the centrifugal action of the rapidly rotating member 168 causes the vapors and suspended liquid particles to impinge upon the heated walls of the scrubber where any liquid particles coalesce, and the resultant liquid stream flows to the drain line 156 and is removed. The stripped vapors thus freed from liquids and while still at high temperatures are rapidly withdrawn and flow to the first condenser of the series hereinbefore described.

Figs. 7 and 8 illustrate still another form of distillation apparatus having the scrubber or its equivalent in the high-temperature distillation zone. Here the hot vapors leaving the atomizing nozzle 35 of the still enter the scrubber chamber 178 through the spiral conduit 180. The latter is disposed longitudinally of the scrubber and discharges fluids downwardly to a bottom outlet 182 spaced from the bottom of the scrubber chamber, the hot vapors and suspended liquid particles being subjected to a centrifugal action as they flow downwardly to the bottom outlet 182, from thence they rise upwardly outside of the conduit 180 under action of the main vacuum pump connected with the last condenser 63 (see Fig. 1) and are quickly removed from the high-temperature distillation zone, through outlet 184. Particles that are liquid at the temperatures within the scrubber 178 are coalesced on the bottom of the scrubber and are withdrawn therefrom through valve-controlled drain line 186, which line also drains any liquid deposited in the still 188.

Figs. 9 and 10 illustrate another type of still-scrubber assembly. Therein, the still 200 is mounted vertically upon checker work 201 within the furnace housing 202. The latter is heat-insulated and is provided with an auxiliary combustion chamber 204 having one or more burners 206, and a baffle 207 to prevent direct flames from striking the bottom of the still. The flue gases leave the furnace through stack 208 having the damper 209. Surrounding the upper portion of the still 200 is a preheating coil 210 functioning similar to the preheater 29 of Fig. 1. The inlet end of the coil is connected with line 115 (see Fig. 1), and the outlet end is connected with the atomizing nozzle 35. The latter is directed downwardly to discharge highly heated vapors and mist towards the bottom of the still. Supported upon the sloping bottom of the still by members 212 and disposed vertically within and axially of the still is a vapor outlet member 214 of generally frusto-conical shape, spaced from the side walls of the still. An outlet line 216 is connected with the outlet of member 214 for conducting vapors therefrom to the series of condensers described in connection with Fig. 1. The lower margin of member 214 has a flange cooperating with a similar flange on inner wall of still 200 to support screens 215 that support a bed of solid contact or scrubbing material of the kind heretofore described. Radial supports 217 connect the said supporting flanges. In this modification, the rate of flow of the atomized material within the still increases during its flow through the contact material. This, together with the abrupt change of direction of the vapors leaving the scrubber, and the slight reduction in their rate of flow at this point in their path, facilitate complete removal therefrom of all liquid components that otherwise would impart undesirable color to the condensate subsequently produced from the vapors. Any liquids deposited in the still or scrubber bottom are withdrawn through valve-controlled line 218. A removable closure 219 in the side wall of the still permits inspection of the inside of still and scrubber, and the treatment or removal of the scrubber material when desired.

Figs. 11 to 15 illustrate forms of the invention involving the employment of a relatively thin lining of corrosion-resistant metal for all parts coming in contact with hot fluids capable of corroding the usual ferrous metals. Preferably those apparatus elements exposed to high temperatures, such as those around 260° C. or above, are constructed entirely of corrosion-resistant metals or alloys such as nickel, stainless steel of the 18% Ni 8% Cr type, or Monel metal, while the elements exposed to lower temperatures, such as the condensers, pipes carrying cool liquids, etc., may be made of these metals or of aluminum. However the cost of the large quantity of these metals required for apparatus constructed entirely therefrom is very great.

Applicant also has made the surprising discovery that it is possible to obtain the desired corrosion-resistance and long life for this type of apparatus made of the ordinary grades of steel and like ferrous metals and alloys and designed to be exposed to corrosive fluids, by securing upon the exposed surfaces of the apparatus a thin sheet lining of the said corrosion-resistant metal having unwelded, uncaulked joints. The lining may be secured to the adjacent walls of the element being lined therewith by any suitable means, such as by spot-welding, or by bolting together flanged margins thereof. Still more surprising and unpredictable is applicant's discovery, now fully demonstrated, that it is possible, by proceeding in the following manner, so to secure such thin metal inner lining upon the metal part to be protected that, although secured to the said part at only a limited number of spaced points, yet over long periods of service it successfully resists all forces acting upon it to induce its collapse, even when a high vacuum is maintained on the still or other vessel thus lined. At the same time this lining definitely prevents the corrosive fluids from reaching the corrodible metal walls of the vessel so lined.

In affixing the metal lining to the vessel, sections of the thin sheet metal lining having lapped margins are joined together when in place in the vessel by having their lapped ends interlapped together, as shown in Fig. 15, after which the parts forming the lapped assembly are pressed or impacted together to produce the type of joint ordinarily known as a "tinner's lap." At spaced points along the line of these seams, as well as at other points in the lining, the same may be secured to the base metal of the vessel by spot-welding, by bolts of corrosion-resistant metal, or the equivalent. When linings are bolted in place, the inner surface of the vessel to be lined preferably is provided with angle members to which the lining may be secured as shown in Fig. 14, in which case the lapped joint formed in the lining is not located in the said angle member. High vacuum fails either to dislodge or otherwise injure the lining, and the interior surface of the vessel is fully protected from corrosion.

Fig. 11 illustrates a still-scrubber assembly having inner linings of the type described. As shown, all parts coming in contact with hot vapors are lined or covered with sheets of corrosion-resistant metal secured in place in the manner indicated. Such parts include the still, scrubber, vapor outlet conduits 43, 49 and 51, and the respective supporting members 240 and 233 for the scrubber and the screen 45. A lapped joint in the metal lining is indicated at 230 in Fig. 11, and on a somewhat larger scale in Figs. 13 and 15. The open-topped scrubber 39 is supported upon the cover plate 46 by the spaced vertical angle members 240. Secured to the scrubber walls are flanged supporting members 231 that cooperate with flanges on the lower end of outlet line 43 to support transverse members 233 carrying the screens 45. Fig. 14 shows a fragment of a still wall having suitably secured thereto a flange member 232. A lining sheet 234 of corrosion-resistant metal covers the inner wall surface and the flange 232. The lining is secured to the said flange by spaced spot welds 236. Both inner and outer surfaces of the scrubber and of the vapor conduit 43 are thus lined.

Thus it is seen that the distillation apparatus of the invention essentially includes an assembly of heated units, comprising a preheater, a spray vaporizing still, a contact separator or scrubber, and a vapor outlet conduit, all disposed within a unitary heat-insulated furnace housing that is provided with means for producing and distributing a high temperature heating medium to selected parts of the said assembly. The scrubber is removably mounted within the furnace housing and can be withdrawn or reached for replacing or cleaning the contact material. Thus, the top part 55 of the housing can be removed, whereupon the scrubber can be disconnected from the still and removed overhead. On the other hand, the still of Fig. 9 is provided with a removable closure in its side wall for use in cleaning or replacing the contact material.

Moreover the process features of the invention essentially comprise spray-vaporizing or atomizing a solution of a heat-sensitive organic material within a hot zone maintained at a temperature approximately as high or higher than that which the said solution possesses immediately prior to its atomization. The vapor mixture thus formed is quickly drawn from the still after passing through a scrubber or contact mass which offers little or no resistance to the passage of the true vapors but which causes coalescence of finely divided liquid or solid particles, thereby forming aggregates of a size and weight sufficient to render them quickly and easily removable from the hot vapor stream when the latter is forced to change its direction suddenly while at the said high temperature. Thereafter the vapors are rapidly removed from the still to the condensing and collecting system wherein the rosin, fatty acids, and solvent are successively condensed by heat exchange with the solution of crude charge liquor flowing to the preheater or heat exchanger 29, and the condensed products are separately recovered.

Preferably the coalesced liquid is removed from the vapor stream with the assistance of gravity or of regulated centrifugal force applied adjacent the vapor outlet from the still. The more quickly these stripped vapors are removed from the high temperature zone within the furnace housing, the purer and freer from color bodies and other impurities will be the distillates subsequently formed. A countercurrent liquid-vapor contact device, such as a dephlegmating column is unsuitable for the treatment of the hot vapors where highly pure distillates are desired. The requisite high speed of atomized vapors through and from the high temperature zone of the still-scrubber assembly preferably is effected under high vacuum or by the use of a rapidly recirculated stream of inert gas. This high speed flow further is facilitated by passing the vapors downward through each of the condensers and removing condensate therefrom in the direction of the flow of the vapors.

The novel method hereindescribed for applying to a metal surface of a vessel or conduit a sheet metal lining of corrosion-resistant metal is of important value in making practicable the commercial development and use of small, relatively inexpensive distillation units adapted for satisfactory and economical service where the amount of materials to be refined is limited, or where the need for distillation is intermittent.

The lining, although held in place at a limited number of points, and while having joints or seams that need not be gas tight, not only resists all forces acting to collapse it, but actually prevents passage of corrosive liquids and distilled vapors into contact with the corrodible metal wall of the still or other device thus lined.

By the term "mechanically coalescing and stripping" and similar terms set forth in the claims, I refer to the removal of non-vaporized and/or non-vaporous components from vaporous components by use of suitable mechanism such as solid scrubbing media of the type described, and equivalent mechanism such as the centrifugal separator shown in Figs. 4 to 8. The term "indirect heat" is used in the claims in its usual sense to designate heat applied from an external source in such manner that the heating fluid is not directly mixed with the vapors being heated, and does not dilute the latter.

Variations may be resorted to within the scope of the following claims without departing from the spirit of the invention.

I claim:

1. Process for distilling a high-boiling, heat-sensitive organic liquid, which comprises atomizing in a distillation zone a flowing stream of such liquid preheated to a temperature below its decomposition point but sufficiently high to convert said liquid to a vapor when atomized within said distillation zone, while applying indirect heat to the resultant stream of vapors to maintain the same in vapor form at a temperature below that at which substantial decomposition of said vapors occurs; thereafter quickly withdrawing the resultant stream of vapors from said distillation zone; and, prior to said withdrawal, mechanically coalescing and stripping therefrom non-vaporous components in a hot stripping zone maintained at a temperature below that at which substantial decomposition of the vapors occurs but at which substantial condensation of said vapors is prevented; quickly withdrawing the stripped vapors from said stripping zone, and preventing countercurrent contact of the stream of stripped vapors with the said non-vaporous components during said stripping and withdrawal steps; and condensing the stripped vapors.

2. Process for distilling a mixture of high-boiling heat-sensitive water-insoluble organic materials which comprises preheating a solution of the said materials in a water-immiscible volatile organic solvent to a temperature sufficient to vaporize said solution of materials substantially undecomposed; atomizing and vaporizing the preheated solution in a highly heated distillation zone while supplying sufficient indirect heat to said zone to maintain the resultant vapors in the vapor phase substantially undecomposed; rapidly withdrawing the vapors from the said zone, and prior to such withdrawal and while at the said high temperature, mechanically coalescing and stripping non-vaporous components from the vapors within said distillation zone while the vapor mixture is maintained at an elevated temperature above that at which condensation of the vapors can occur during said stripping step; preventing countercurrent contact of the stripped vapors and the non-vaporous components during said stripping step; fractionally condensing the stripped vapors; and separately recovering fractions containing the said organic materials.

3. Process as defined in claim 2 wherein the high temperature maintained within the distillation zone is produced by a single source of heat.

4. Process as defined in claim 2 wherein the fractional condensation of the stripped vapors is effected while preventing substantial countercurrent flow of the resultant condensate in contact with the stripped vapors.

5. Process as defined in claim 2 wherein condensation of the stripped vapors is effected by heat-exchange with a solution of said heat-sensitive materials flowing to said distillation zone.

6. Process as defined in claim 2 wherein the said atomizing, stripping and condensation steps are conducted in the presence of a stream of an inert gas that is non-condensible under the conditions of its use.

7. Process as defined in claim 2 wherein a stream of inert gas is introduced into said distillation zone with the preheated solution.

8. Process as defined in claim 2 wherein a stream of inert gas is introduced into said distillation zone with the preheated solution, and subsequently is separated from the condensed vapors and recycled in the process.

9. Process for recovering rosin and fatty acids from crude mixtures of heat-sensitive organic materials containing the same and derived from alkaline wood pulping liquors, which comprises preheating a solution of said materials in a volatile water-immiscible solvent therefor to a temperature below that at which said materials are substantially decomposed with the formation of color bodies but at which said materials distill when exposed to sub-atmospheric pressure; atomizing the preheated solution within a distillation zone maintained under sub-atmospheric pressure and at a temperature adapted to vaporize and distill rosin and fatty acids substantially undecomposed when the preheated solution is subjected to said sub-atmospheric pressure; promptly thereafter mechanically coalescing and removing from the resultant vapors non-vaporized liquid and solid components present therein while said vapors of rosin and fatty acids are within said distillation zone, thereby preventing condensation of vapors, quickly removing the stripped vapors from the high temperature zone; preventing countercurrent flow of said vapors and said non-vaporized components in contact with each other during such coalescing and removal steps; and fractionally condensing from the stripped vapors said rosin and said fatty acids.

10. Process for recovering rosin and fatty acids from a mixture of heat-sensitive organic materials containing the same, which comprises preheating a flowing body of a solution of said materials in a water-immiscible volatile organic solvent therefor to a temperature at which said solution distills substantially undecomposed when the vapor pressure thereof is increased; spray-vaporizing the flowing preheated solution within a distillation zone maintained at a temperature approximating that of the preheated solution while increasing the vapor pressure of the resultant vapors at said temperature; quickly coalescing and removing from the vapor stream while at said distillation zone temperature non-vaporized liquid and solid components present therein, by means of a solid coalescing medium having a high percentage of voids, and offering substantially little resistance to vapor flow therethrough, and maintained at a temperature at which the vaporized components remain in vapor form substantially undecomposed, while concurrently preventing countercurrent contact of the stripped vapors and said non-vaporized components and preventing condensation of said vapors; immediately thereafter removing the stripped vapors from said distillation and coalescing zone; and separately condensing from the stripped vapors the said rosin and fatty acids.

11. Process for recovering rosin and fatty acids present in crude mixtures thereof derived from alkaline wood pulping liquors produced in the pulping of wood, which comprises forming a solution of such crude mixture in a volatile organic solvent; separating from the resultant solution materials insoluble therein; preheating the residual solution to a high temperature capable of vaporizing said solution when under vacuum but below the decomposition temperature of said rosin, fatty acids and solvent; atomizing the preheated solution in a vacuumized distillation zone maintained at said high temperature by indirect heat applied thereto, thereby vaporizing said solution at a temperature insufficiently high to decompose substantial amounts of said rosin and fatty acids; quickly coalescing and removing non-vaporized components from the vapors while the latter are approximately at the temperature of said distillation zone, by a solid scrubbing medium having a high percentage of voids and offering substantially little resistance to the free flow of vapors therethrough, while preventing substantial condensation of said vapors, and while avoiding countercurrent flow of the stripped vapors relative to the coalesced components; quickly thereafter withdrawing the stripped vapors from the high temperature zone; fractionally condensing the stripped vapors; and recovering the rosin and fatty acids.

12. Process for distilling a liquid mixture of high-boiling, heat-sensitive organic materials containing rosin and fatty acids which comprises preheating a solution of said liquid mixture in a water-immiscible volatile organic solvent at a high temperature at which said materials and solvent distill substantially undecomposed when subjected to sub-atmospheric pressure; atomizing the preheated solution within a distillation zone maintained at such temperature and under sub-atmospheric pressure, thereby vaporizing said liquid mixture; applying to said distillation zone heat sufficient to prevent substantial condensation of the resultant vapors but insufficient to cause substantial decomposition of said materials; rapidly withdrawing the said vapors from the distillation zone; and, prior to such withdrawal, and while at the said high temperature, coalescing and stripping non-vaporous components from the vapors in a stripping zone, by flowing the mixed vapors in one direction through a contact body having a high percentage of voids sufficient to allow free passage of the vapors and facilitate maintenance of said sub-atmospheric pressure, and maintained at approximately the temperature of the vapors in said distillation zone, thereby preventing substantial condensation of said vapors; thereafter condensing the stripped vapors by indirect heat-exchange with a body of said liquid mixture flowing to the atomizing zone; subsequently atomizing the liquid thus heated; and, in the respective stripping and condensing steps, removing the non-vaporous components while preventing countercurrent flow thereof in contact with the associated vapors.

13. Process for recovering heat-sensitive components of a mixture of high-boiling materials derived from alkaline wood pulping liquors and containing fatty acids and rosin, which comprise forming a solution of said mixture in a major portion of a water-immiscible volatile solvent; separating solids from said solution; preheating the residual solution to a high temperature at which the rosin and fatty acids are vaporized when exposed to subatmospheric pressure but below the temperature at which substantial decomposition of a component of the solution occurs; atomizing the preheated solution within a distillation zone maintained under said sub-atmospheric pressure and at a temperature within the range between about 245° and 275° C.; quickly coalescing and removing non-vaporized components from the resultant vapors in said distillation zone, while maintaining free flow of the vapors through and from said zone, and while preventing substantial condensation of the vapors, and while preventing countercurrent contact of said vapors with said non-vaporized components; rapidly withdrawing the stripped vapors from said distillation zone; fractionally condensing the stripped vapors; and separately recovering the rosin, fatty acids and solvent.

14. Process for distilling a high-boiling heat-sensitive oil, which comprises preheating a solution of said oil in a volatile water-immiscible organic solvent; atomizing the preheated solution within a distillation zone maintained under vacuum and at a high temperature at which said oil and solvent distill substantially undecomposed when subjected to said vacuum; applying indirect heat to the atomized solution in said zone to maintain the resultant vapors undiluted and in the vapor phase at a temperature below the decomposition temperature of said oil and solvent; rapidly and quickly coalescing and stripping non-vaporous components from said vapors while preventing substantial condensation of the latter and while preventing countercurrent contact of the vapors and non-vaporous components; quickly thereafter withdrawing the stripped vapors from said distillation zone; and fractionally condensing the vapors of said oil and said solvent.

15. Process for distilling a mixture of high-boiling heat-sensitive materials including rosin and fatty acids which comprise atomizing a highly heated solution of said mixture in a water-immiscible volatile solvent within a distillation zone maintained under sub-atmospheric pressure and at a temperature at which the solution distills when the same is subjected to sub-atmospheric pressure, but below that at which said materials and solvent are substantially decomposed; quickly thereafter flowing the resultant products into contact, in a stripping zone, with a solid coalescing medium having a high percentage of voids and maintained at a temperature effectively preventing substantial condensation of the vapors, thereby coalescing and separating non-vaporized substances from said vapors while maintaining a rapid free flow of the vapors through and from said distillation and stripping zones; thereafter quickly withdrawing the vapors from the stripping zone; preventing countercurrent contact of the coalesced substances with the stripped vapors during each of said coalescing and withdrawal steps; fractionally condensing said stripped vapors by indirect heat-exchange with a solution of said heat-sensitive liquid flowing to the atomizing zone, and separately recovering the respective condensates containing rosin and fatty acids.

16. Process for recovering rosin and fatty acids present in crude mixtures thereof derived from alkaline wood pulping liquors produced in the pulping of wood, which comprises the steps of preheating a solution of the said mixture in a water-immiscible volatile rosin solvent at an elevated temperature sufficiently high to vaporize rosin and fatty acid components at the pressure existing in a distillation zone, but below the temperature at which substantial decomposition of such components of the solution occurs; thereafter flash-vaporizing the preheated solution into a vacuumized distillation zone maintained at an elevated temperature at which vaporizable components of the preheated solution are vaporized at the pressure existing in said zone, but below the decomposition temperature of components of said solution; quickly thereafter withdrawing the resultant vapors from said zone; and, prior to said withdrawal, and while the vapors are maintained at the temperature of the distillation zone, mechanically coalescing and stripping non-vaporous components from the vapors in a hot stripping zone under conditions permitting free flow of vapors through and from the distillation and stripping zones; preventing countercurrent contact of the stripped vapors and non-vaporous components during the stripping step; and thereafter fractionally condensing from the stripped vapors said rosin and fatty acids.

17. Process for distilling a high-boiling heat-sensitive organic liquid, which comprises preheating the liquid to a vaporization temperature below its decomposition point, atomizing the preheated liquid into a high temperature enclosed zone, supplying indirect heat to the said zone to maintain said high temperature, the atomized liquid being separated into liquid and vapor components in said zone by passing all components of the atomized liquid through a scrubbing medium of the class consisting of glass wool, mineral wool, steel wool, glass beads or pieces of earthenware in one direction only, and rapidly withdrawing the vapors away from the liquid components.

EDWARD H. FRENCH.